United States Patent
Schulte

(10) Patent No.: US 7,374,706 B2
(45) Date of Patent: *May 20, 2008

(54) METHOD FOR PRODUCING ADHESIVE CLOSURE PARTS

(75) Inventor: Axel Schulte, Holzgerlingen (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 667 days.

This patent is subject to a terminal disclaimer.

(21) Appl. No.: 10/239,309

(22) PCT Filed: Nov. 20, 2001

(86) PCT No.: PCT/EP01/13384

§ 371 (c)(1),
(2), (4) Date: Sep. 20, 2002

(87) PCT Pub. No.: WO02/051276

PCT Pub. Date: Jul. 4, 2002

(65) Prior Publication Data

US 2003/0038408 A1 Feb. 27, 2003

(30) Foreign Application Priority Data

Dec. 22, 2000 (DE) ............... 100 65 819
Feb. 14, 2001 (DE) ............... 101 06 705

(51) Int. Cl.
- A44B 18/00 (2006.01)
- B05D 1/02 (2006.01)
- B05D 3/06 (2006.01)
- B29C 35/08 (2006.01)

(52) U.S. Cl. ............ 264/129; 264/349; 264/447; 264/492; 264/494; 427/424; 427/427.3; 427/427.4; 427/557; 427/558

(58) Field of Classification Search ........... 264/171.13, 264/405, 447, 493, 494, 401, 497, 129, 349; 156/242, 291; 427/421, 557, 558, 424, 427.3, 427/427.4; 700/118, 119

See application file for complete search history.

(56) References Cited

U.S. PATENT DOCUMENTS

| | | | |
|---|---|---|---|
| 3,408,705 A * | 11/1968 | Kayser et al. | 24/452 |
| 3,550,837 A | 12/1970 | Erb | |
| 4,111,634 A | 9/1978 | Limbach et al. | |
| 4,587,152 A * | 5/1986 | Gleichenhagen et al. | 428/195.1 |
| 4,875,259 A * | 10/1989 | Appeldorn | 24/584.1 |
| 4,897,026 A | 1/1990 | Yokoya | |
| 5,059,266 A * | 10/1991 | Yamane et al. | 156/64 |

(Continued)

FOREIGN PATENT DOCUMENTS

DE 19906008 8/2000

(Continued)

*Primary Examiner*—Melvin Mayes
(74) *Attorney, Agent, or Firm*—Roylance, Abrams, Berdo & Goodman, L.L.P.

(57) ABSTRACT

A method produces adhesive closure parts, where a partial segment of the surface of a support element (10) is provided with adhesive closure elements (3) which stand out from its plane by applying a plastic material that forms adhesive closure elements on the support element (1). The adhesive closure elements (3) are formed without any forming tools, at least in a given area, by depositing the plastic material in successively delivered droplets using an applicator (9).

35 Claims, 4 Drawing Sheets

U.S. PATENT DOCUMENTS

| | | | |
|---|---|---|---|
| 5,136,515 A * | 8/1992 | Helinski ..................... 700/119 |
| 5,231,738 A * | 8/1993 | Higashinaka ................ 24/446 |
| 5,369,853 A * | 12/1994 | Okawa et al. ................ 24/446 |
| 5,392,498 A * | 2/1995 | Goulait et al. ................ 24/452 |
| 5,536,759 A * | 7/1996 | Ramharack et al. .......... 522/35 |
| 5,540,673 A * | 7/1996 | Thomas et al. ............. 604/391 |
| 5,625,929 A * | 5/1997 | Hattori et al. ................ 24/452 |
| 5,694,324 A * | 12/1997 | Masters et al. ............. 700/118 |
| 5,725,704 A * | 3/1998 | Gallagher et al. ............ 156/66 |
| 5,762,645 A * | 6/1998 | Peck et al. .................. 604/391 |
| 5,792,411 A | 8/1998 | Morris et al. |
| 5,868,987 A * | 2/1999 | Kampfer et al. ............ 264/280 |
| 5,951,931 A * | 9/1999 | Murasaki et al. ............ 264/167 |
| 6,276,032 B1 * | 8/2001 | Nortman et al. ............ 24/572.1 |
| 6,287,665 B1 * | 9/2001 | Hammer ..................... 428/100 |
| 6,393,673 B1 * | 5/2002 | Kourtidis et al. ............. 24/304 |
| 6,460,229 B1 * | 10/2002 | Schulte ........................ 24/448 |
| 6,509,084 B2 * | 1/2003 | Sturtevant et al. .......... 428/141 |
| 6,572,727 B1 * | 6/2003 | Schulte ....................... 156/278 |
| 6,627,133 B1 * | 9/2003 | Tuma ......................... 264/167 |
| 6,730,069 B2 * | 5/2004 | Tanzer et al. ............... 604/391 |
| 2001/0018110 A1 * | 8/2001 | Tuman et al. ................. 428/99 |
| 2002/0111707 A1 * | 8/2002 | Li et al. ...................... 700/118 |
| 2003/0104137 A1 * | 6/2003 | Schulte ....................... 427/421 |
| 2004/0180186 A1 * | 9/2004 | Jackson et al. .......... 428/306.6 |
| 2005/0153096 A1 * | 7/2005 | Gerber et al. ................. 428/85 |

FOREIGN PATENT DOCUMENTS

| FR | 2166427 | * | 8/1973 |
| WO | 9703630 | | 2/1997 |
| WO | 0133989 | | 5/2001 |

* cited by examiner

METHOD FOR PRODUCING ADHESIVE CLOSURE PARTS

REFERENCE TO RELATED APPLICATION

This application is related to U.S. patent application Ser. No. 10/312,782, filed on Dec. 30, 2002 in the name of Axel Schulte and entitled "Method of Producing Adhesive Closing Parts."

FIELD OF THE INVENTION

The present invention relates to a method for production of adhesive closure parts, in which a backing element is provided in at least one component area of its surface with adhesive closure parts. A plastic material forming the adhesive closure part is applied to the backing element.

BACKGROUND OF THE INVENTION

DE 198 28 856 C1 discloses a conventional process for producing adhesive closure parts which is relatively expensive, especially if adhesive fastener elements produced are applied in very high packing density and are small in size. For example, in production of so-called microfasteners, the adhesive fastener elements are provided in the form of stems thickened at the ends or with side projections in very high packing densities (for example, 200 or more adhesive fastener elements per square centimeter). Form tools, such as dandy rollers, are required for shaping the stems as desired on the end side. Very high production costs are occasioned by the very large number of sieve openings, which openings may be produced by etching, electroplating, or laser treatment.

SUMMARY OF THE INVENTION

Objects of the present invention are to provide a process permitting especially economical production of adhesive fastener elements which are tightly packed in the widest possible variety of shapes desired.

In the process of the present invention, the adhesive fastener elements are formed without use of a form tool at least in one component area. Plastic material is deposited by at least one application device in the form of the finest possible droplets applied in succession. The places selected for deposit of the droplets are three-dimensional with respect to the shape of the particular adhesive fastener elements to be formed.

The process of the present invention, characterized by extremely fine droplets deposited in succession in selected places, permits formation of adhesive fastener elements of any configuration and of virtually any degree of fineness, and achieves the high packing densities desired without the need for correspondingly costly development of form tools. Control of the places of droplet deposit are accomplished by appropriate relative movements of deposit device and backing element, preferably under computer control. This process permits not only formation without difficulty of the shapes disclosed in DE 198 856 C1 referenced above, as stems with mushroom heads, with stellate heads, and the like, but also permits which shapes cannot be produced at all, or can be produced only with great difficulty, with conventional form tools, such as loops, hooks, or anchors. Such additional elements can be shaped only poorly or not at all by a form tool because of the undercuts present.

Preferably the application device has at least one nozzle from which the plastic material is sprayed in droplets of a size of a few picoliters. Such spray devices for centrifuging liquid plastic material may be operated by piezoelectric or electrothermal means. The plastic material can preferably be an acrylate, which sets after depositing of each droplet or group of droplets, for example, by the action of electromagnetic radiation. The deposit site can be subjected to ultraviolet radiation, or the setting can be by a chemical reaction. The plastic material may, however, also be a thermoplastic set by cooling.

The adhesive fastener elements may be produced at a high speed of operation, since spray application of successive drops can be carried out at a high rate. Cycle speeds of several kilohertz may be reached immediately in computer-controlled operation. An application device having a plurality of nozzles actuated simultaneously may also be provided to develop a plurality of several rows of adhesive fastener elements simultaneously.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
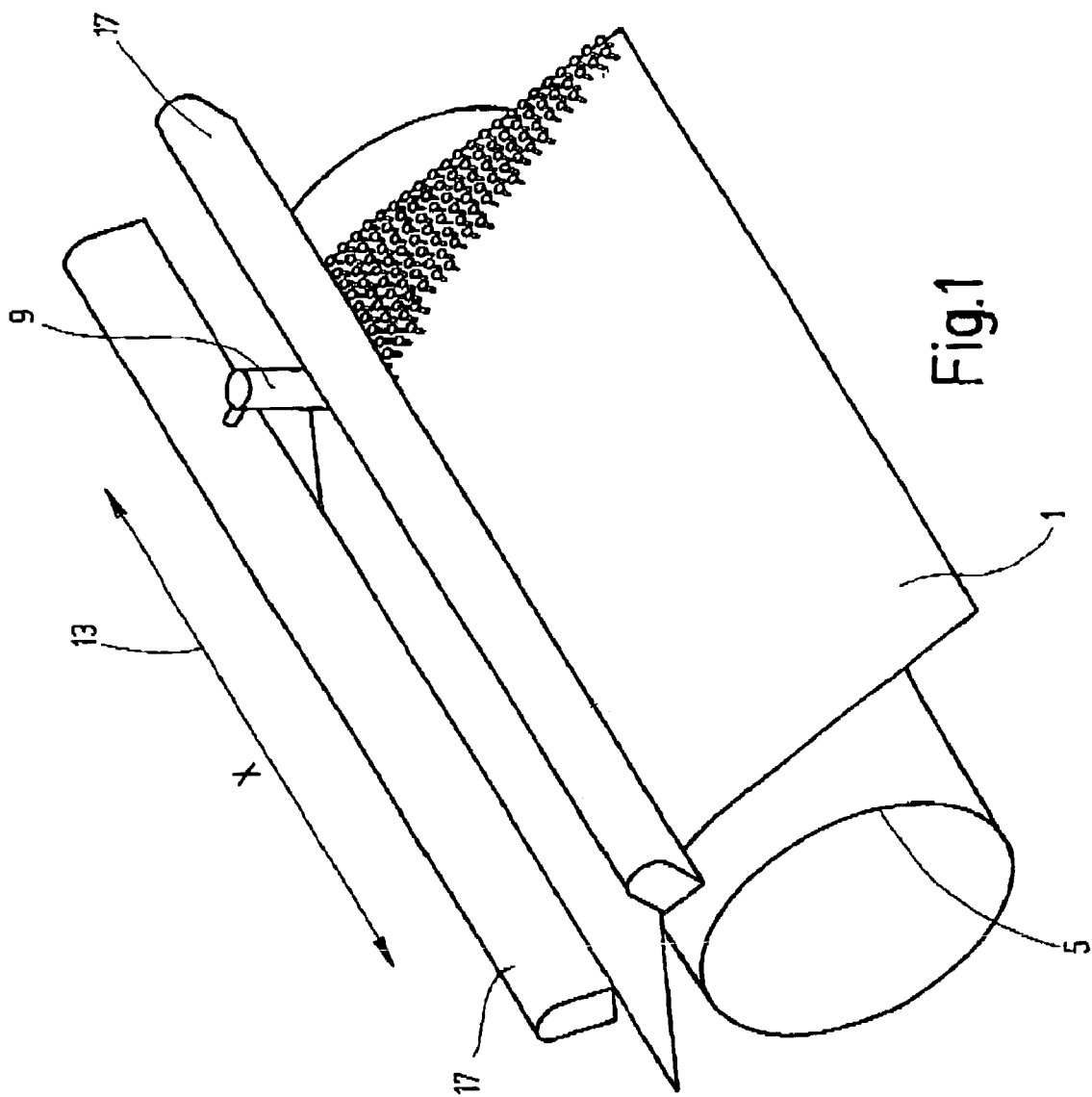
FIG. 1 is a highly simplified, diagrammatic perspective view of a device for application of a process according to a first embodiment of the present invention.
Figure 2:
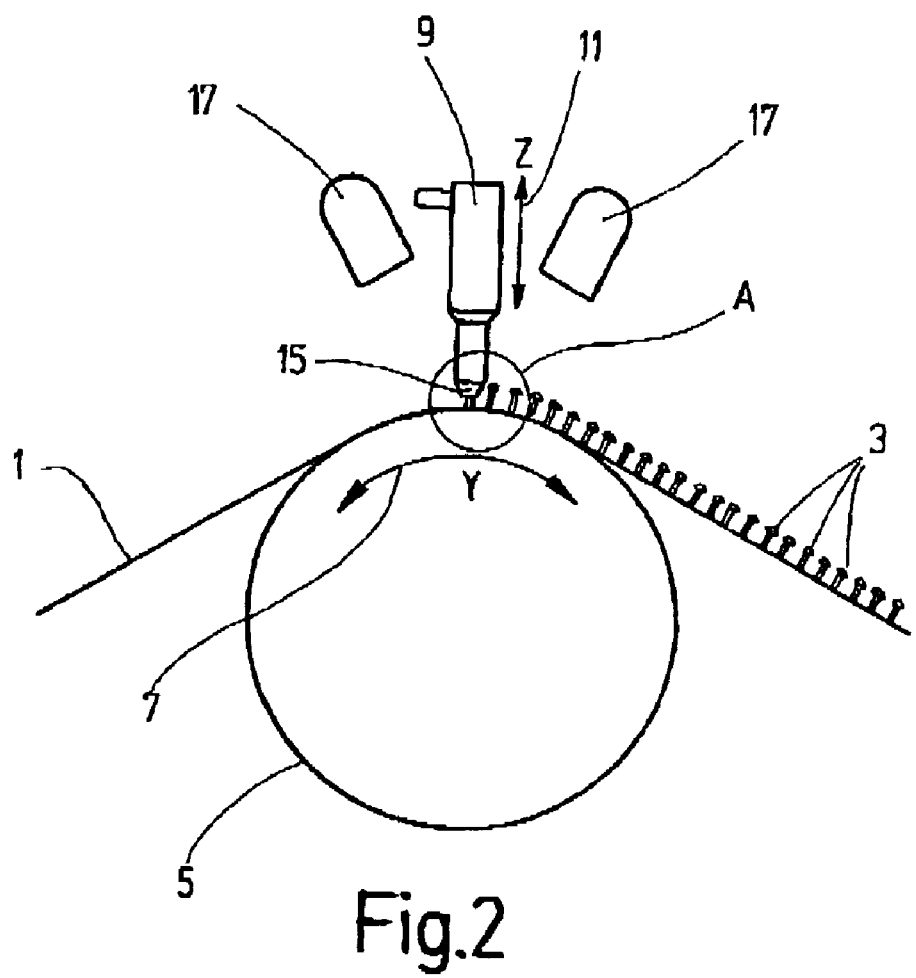
FIG. 2 is a diagrammatic side elevational view of the device shown in FIG. 1.
Figure 3:
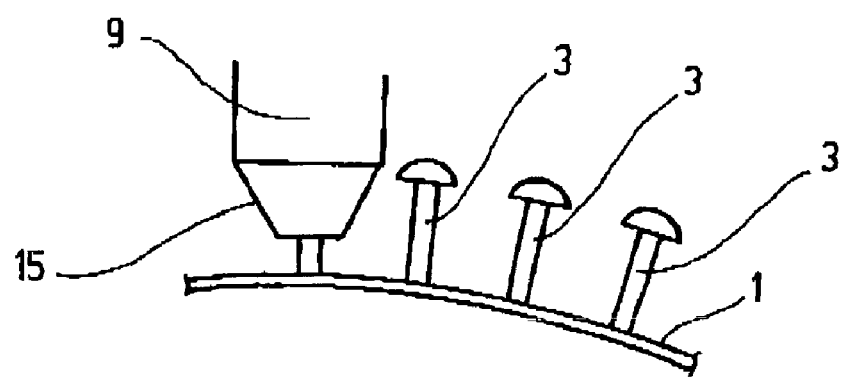
FIG. 3 is an enlarged side elevational view of the area identified as A in FIG. 2.

FIGS. 1 to 3 illustrate the process of the present invention in which adhesive fastener elements 3 are formed on a surface of a backing element 1 in the form of a sheet of PET. Adhesive fastener elements 3 have thickened areas on their ends. In the example presented in FIGS. 1 to 3, the thickened areas on the ends resemble mushrooms, as seen from FIG. 3 in particular. For the sake of clarity, the adhesive fastener elements in all the figures are illustrated greatly exaggerated in size and spaced at greatly exaggerated intervals from each other.

The backing element 1 rests on a guide roller 5 which may be driven in both directions of rotation for execution of controlled rotary steps. The backing element 1 may be moved back and forth (as shown by the curved arrow 7 in FIG. 2) in the Y axis direction within a droplet application area situated inside an application area A. Droplets of liquefied plastic material are applied by an application device 9, which may be moved in the Z direction or axis (see double arrow 11 in FIG. 2) and in the direction of the X axis (see double arrow 13 in FIG. 1) perpendicular to the Z axis. Consequently, the location selected for droplet application relative to the backing element 1 may be three-dimensional. The guide roller 5, and accordingly the backing element 1, as well the application device 9, move correspondingly. As an alternative, the application device 9 could move along all three axes (X, Y, and Z) relative to the backing element 1.

The application device 9, in the example illustrated in FIGS. 1 to 3, has a nozzle 15 through which the liquefied plastic material is sprayed. In the operating situation shown in FIG. 3, the nozzle 15 assumes a position relative to the backing element 1 such that the stem of an adhesive fastener element 3 is built up by successive spraying of droplets, each of a few picoliters. In the situation illustrated in FIG. 3, the stem sprayed through the nozzle 15 has been built up to about one third of its height, preferably under computer control, at a high rate of 2 kilohertz, for example. The droplets which have been applied set during the intervals between spraying processes. This setting can be accomplished in various ways, for example, by spray application of a hardening medium or by supply of energy, by ultraviolet irradiation in particular. In the present case ultraviolet lamps 17 are provided in addition to the application device 9 for irradiation of the application area A with ultraviolet radiation. For the setting processes, the application device 9 preferably is withdrawn along the Z axis and/or the backing element 1 is displaced by movement of the guide roller 5 along the Y axis before the corresponding elements are returned to the position selected for drop application in the following spray process.

Figure 4:
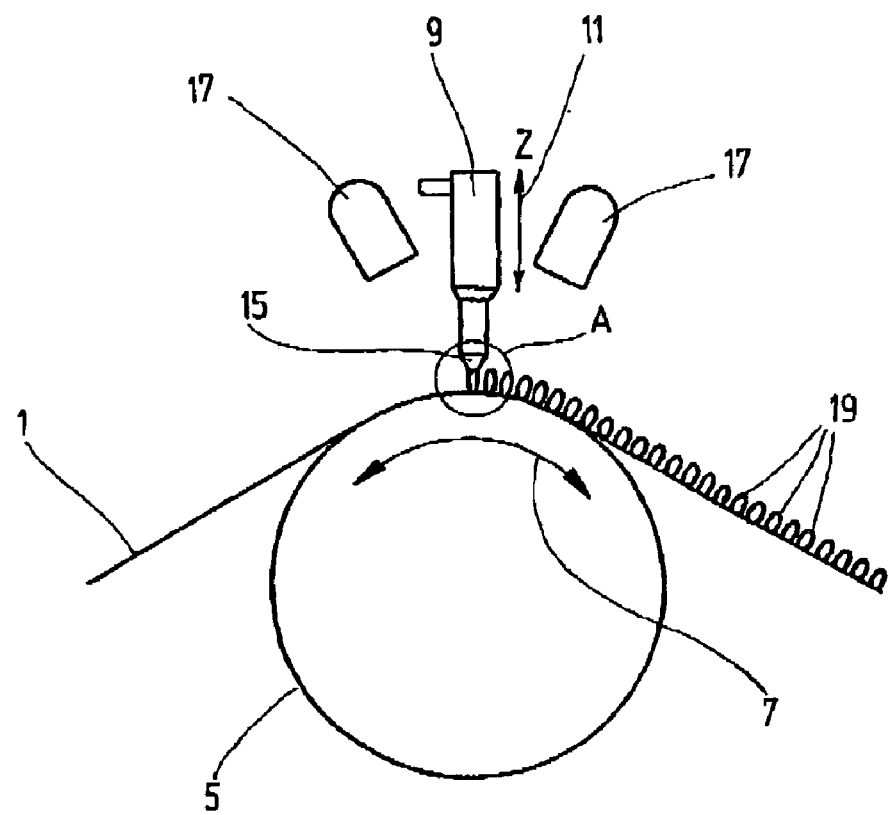
FIG. 4 is a side elevational view of a device similar to that shown in FIG. 2, for the production of looped adhesive fastener elements according to a second embodiment of the present invention.
Figure 5:
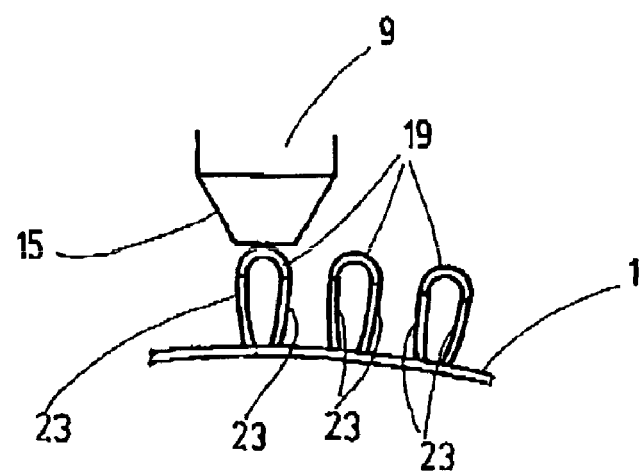
FIG. 5 is an enlarged side elevational view of the area identified as A in FIG. 4.

FIGS. 4 and 5 illustrate an application of the process for production of adhesive fastener elements in which adhesive fastener elements 19 in the form of loops are formed on the backing element 1. In the process, two stems 23 are first built up for each loop, and are then bent over in arcs as illustrated in FIG. 5.

Figure 6:
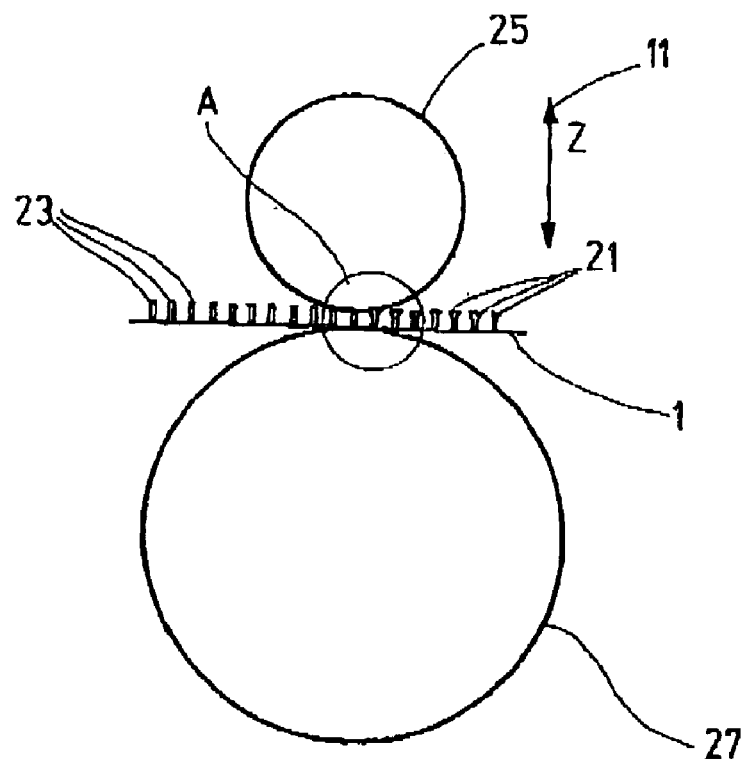
FIG. 6 is a highly simplified, diagrammatic side elevational view of a device for production of adhesive fastener elements with trough-shaped heads passed through calendars according to a third embodiment of the present invention.
Figure 7:
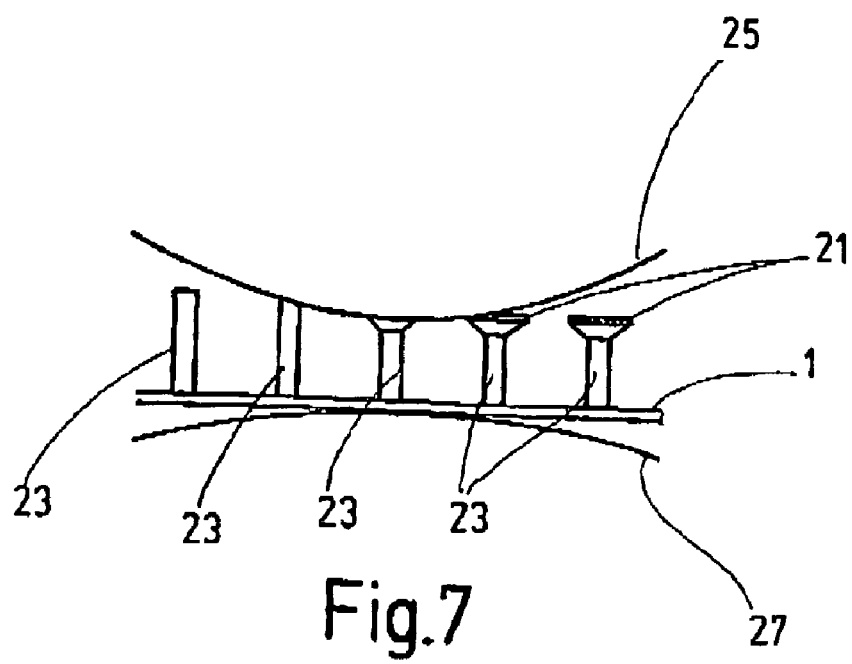
FIG. 7 is an enlarged side elevational view of the area identified as A in FIG. 6.

FIGS. 6 and 7 illustrate the production of adhesive closure parts with adhesive fastener elements 21 formed by first building up stems 23 without thickened areas on the ends. A pressure gap is formed by a calendar roller 25 operating in conjunction with a mating roll 27. The thickened end areas of the adhesive fastener elements 21 are formed as trough-shaped (see FIG. 7) by calendering on the ends of the stems 23.

Liquefied acrylates, the viscosity of which may be adjusted by addition as desired of a reactive thinner, for example, are suitable as plastic material to be applied in droplet form. The hardenability by ultraviolet radiation can be promoted, preferably, by addition of a photoinitiator.

In one example the plastic material contains as acrylic material of 90 percent Ebecryl 4835, a prepolymer made by the UCB company, 8 percent HDDA (UCB company) as a reactive thinner for viscosity adjustment, and 2 percent Darocur 1173, made by the Ciba-Geigy company, as a photoinitiator.

In another example, 90-percent Ebecryl 4835 and 4-percent Ebecryl 230 from the UCB company are provided as acrylate materials. 4-percent HDDA from the UCB company is employed as a reactive thinner, and 2-percent Darocur from the Ciba-Geigy company is used as a photoinitiator.

Plastic materials of different compositions may, of course, also be employed for application of the process of the present invention. Backing elements of a different nature, such as textile materials, or moulded elements provided for special applications may be provided in place of a sheet of polyethylene.

The present invention is described in the foregoing on the basis of examples in which the adhesive fastener elements as a whole are in the form of droplets spray-applied in succession. The process may, of course, also be applied to advantage in such a way that simply formed stems of adhesive fastener elements may, when straight stems, for example, are involved, be produced conventionally with form tools, with no additional expense, as initial material onto which droplets of the geometric configurations desired are then sprayed to produce finished adhesive fastener elements.

While various embodiments have been chosen to illustrate the invention, it will be understood by those skilled in the art that various changes and modifications can be made therein without departing from the scope of the invention as defined in the appended claims.

What is claimed is:

1. A method of producing adhesive closure parts having a backing element with adhesive fastener elements formed in one component area of a surface of the backing element and projecting from the surface of the backing element, comprising the steps of:

forming essentially all of the adhesive fastener elements on the backing element by depositing a plurality of droplets of plastic material in the component area in succession on the backing element by at least one application device without using a form tool, the application device having at least one nozzle from which the plastic material is sprayed in droplets with each droplet having a volume measured in picoliters and where the plurality of droplets have a volume sufficient to form a fastener element; and controlling locations of the droplets in three dimensions by moving the backing element and nozzle.

2. A method according to claim 1 wherein
the locations are selected based on desired forms for the adhesive fastener elements.

3. A method according to claim 1 wherein
liquid plastic is sprayed from the nozzle.

4. A method according to claim 1 wherein
the plastic material is solidified after depositing each droplet.

5. A method according to claim 1 wherein
the plastic material is solidified after a group of droplets are deposited in the component area.

6. A method according to claim 1 wherein
the plastic material is solidified after being deposited in droplets by supply of energy.

7. A method according to claim 6 wherein
the energy is electromagnetic radiation.

8. A method according to claim 7 wherein
the energy is ultraviolet radiation or infrared radiation.

9. A method according to claim 6 wherein
the energy results from a chemical reaction.

10. A method according to claim 6 wherein
at least one of the backing element and the application device is moved for solidification to a location different from a position for a preceding droplet deposit.

11. A method according to claim 6 wherein
after solidification, the plastic material has a controllable flexibility suitable for engagement and releasing of adhesive fastener elements.

12. A method according to claim 1 wherein
the droplets are deposited at a frequency greater than 50 hertz.

13. A method according to claim 12 wherein
the frequency is in a kilohertz range.

14. A method according to claim 1 wherein
each fastener element is formed by a plurality of superposed droplets.

15. A method of producing adhesive closure parts having a backing element with mechanical fastener elements formed in one component area of a surface of the backing element and projecting from the surface of the backing element, comprising the steps of:
    forming essentially all of the fastener elements in succession on the backing element by depositing a plurality of droplets of a plastic material in succession to produce superposed droplets in the component area on the backing element by at least one application device without using a form tool; and
    solidifying the plastic material after deposit of one of each droplet and each group of droplets by delivery of energy.

16. A method according to claim 15 wherein
the application device has at least one nozzle; and
plastic material is sprayed from the nozzle with each droplet having a volume measured in picoliters.

17. A method according to claim 16 wherein
liquid plastic is sprayed from the nozzle.

18. A method according to claim 16 wherein
the backing element and the nozzle are moved to vary the locations of the droplets in three dimensions.

19. A method according to claim 15 wherein
the energy is electromagnetic radiation.

20. A method according to claim 19 wherein
the energy is ultraviolet radiation or infrared radiation.

21. A method according to claim 15 wherein
the energy results from a chemical reaction.

22. A method according to claim 15 wherein
at least one of the backing element and the application device is moved for solidification to a location different from a position for a preceding droplet deposit.

23. A method process according to claim 15 wherein
after solidification, the plastic material has a controllable flexibility suitable for engagement and releasing of the fastener elements.

24. A method according to claim 15 wherein
the droplets are deposited at a frequency greater than 50 hertz.

25. A method according to claim 24 wherein
the frequency is in a kilohertz range.

26. A method according to claim 15 wherein
the locations are controlled and selected in three dimensions based on desired forms for the adhesive fastener elements.

27. A method according to claim 15 wherein
said mechanical fastener elements are hooks, and the method further comprises manipulating the application device to successively deposit the droplets to form the hooks.

28. A method according to claim 15 wherein
said mechanical fastener elements are loops, and the method further comprises manipulating the application device to deposit the droplets successively to form the loops.

29. A method of producing adhesive closure parts having a backing element with mechanical fastener elements formed in one component area of a surface of the backing element and projecting from the surface of the backing element, comprising the steps of:
    forming essentially all of the fastener elements on the backing element by depositing a plurality of droplets of plastic material in the component area in succession on the backing element by at least one application device without using a form tool, said deposited droplets being superimposed to form the fastener elements having a height and a width; and
    solidifying the plastic material after deposit of each droplet or each group of droplets by delivery of energy to the droplet or droplets, wherein said energy is selected from the group consisting of electromagnetic radiation, ultraviolet radiation, infrared radiation, or a chemical reaction.

30. The method according to claim 29, wherein said fastener elements are formed in succession.

31. The method according to claim 29, wherein said droplets are deposited in succession while moving the application device away from the backing element to form the height of said fastener element.

32. The method according to claim 29, wherein the application device deposits the droplets to form sequentially a plurality of spaced-apart fastener elements.

33. The method according to claim 29, wherein each of said fastener elements has a stalk with an enlarged fastener head, and the method further comprises positioning the application device to deposit the succession of droplets to form the stalk and enlarged head.

34. The method according to claim 29, wherein said at least one application device is at least one nozzle, and where said method comprises successively moving the nozzle to a selected location with respect to said backing element and depositing a plurality of droplets of the plastic material to form the fastener elements.

35. The method according to claim 29, comprising depositing a first group of droplets on the backing element, solidifying the first group of droplets by applying energy thereto, and thereafter depositing a second group of droplets on the first group of droplets.

* * * * *